United States Patent [19]

Lukhvich et al.

[11] 4,291,270
[45] Sep. 22, 1981

[54] APPARATUS WITH A PERMANENT MAGNET FOR GAUGING THE THICKNESS OF COATINGS ON METAL PRODUCTS WITH MAGNETIC SHUNT TO ADJUST FOR DEMAGNETIZATION OF THE PERMANENT MAGNET

[76] Inventors: Alexandr A. Lukhvich, ulitsa A. Kulman, 15, kv. 18; Valery A. Rudnitsky, ulitsa Slavinskogo, 35, kv. 36; Ivan I. Linnik, prospekt Partizansky, 32, korpus 1, kv. 91; Genrikh B. Gavris, Leninsky prospekt, 127, kv. 265, all of Minsk, U.S.S.R.

[21] Appl. No.: 27,071

[22] Filed: Apr. 4, 1979

[30] Foreign Application Priority Data

Apr. 4, 1978 [SU] U.S.S.R. ............................ 2598349

[51] Int. Cl.³ ................. G01B 7/10; G01R 33/12
[52] U.S. Cl. ................................. 324/230; 324/225
[58] Field of Search .................... 324/229–231; 73/1 R; 33/169 F, DIG. 1

[56] References Cited

U.S. PATENT DOCUMENTS

| | | |
|---|---|---|
| 2,903,645 | 9/1959 | Wright et al. ............... 33/DIG. 1 |
| 3,521,160 | 7/1970 | Nix et al. |
| 3,716,779 | 2/1973 | Akulov |

*Primary Examiner*—Gerard R. Strecker
*Assistant Examiner*—Walter E. Snow
*Attorney, Agent, or Firm*—Fleit & Jacobson

[57] ABSTRACT

An apparatus for gauging the thickness of coatings on metal products comprises a casing which accommodates a wheel system; a spring actuator with a mechanism for its winding, the actuator being linked to the wheel system so as to enable its rotation; two levers independently balanced in a static state the first of which carries a permanent magnet interacting through its field with a ferromagnetic coating on a product or with the base thereof in case of a nonmagnetic coating, the second of the two levers interacting with the first lever in the event when its force necessary to break away the permanent magnet from the product being gauged is insufficient; two coiled springs, the first of which is connected through one end thereof with the first lever and through the other end with one of the shafts of the wheel system, the second of the two coiled springs being connected through one of its ends with the second lever and through the other end thereof with a spring tensioning control mechanism. Attached to the casing is a magnetic element adapted to attract the permanent magnet after the latter has broken away from the product being gauged. The first lever is returned to its initial position by a reset lever mounted in the casing and connected with the central shaft of the wheel system. Mounted on the central shaft of the wheel system is a pointer for indicating a gauged thickness on a circular scale rigidly secured to the casing. The apparatus is provided with an adjusting shunt mounted in the casing for movement along the permanent magnet and intended for correcting the attractive force of the latter.

3 Claims, 4 Drawing Figures

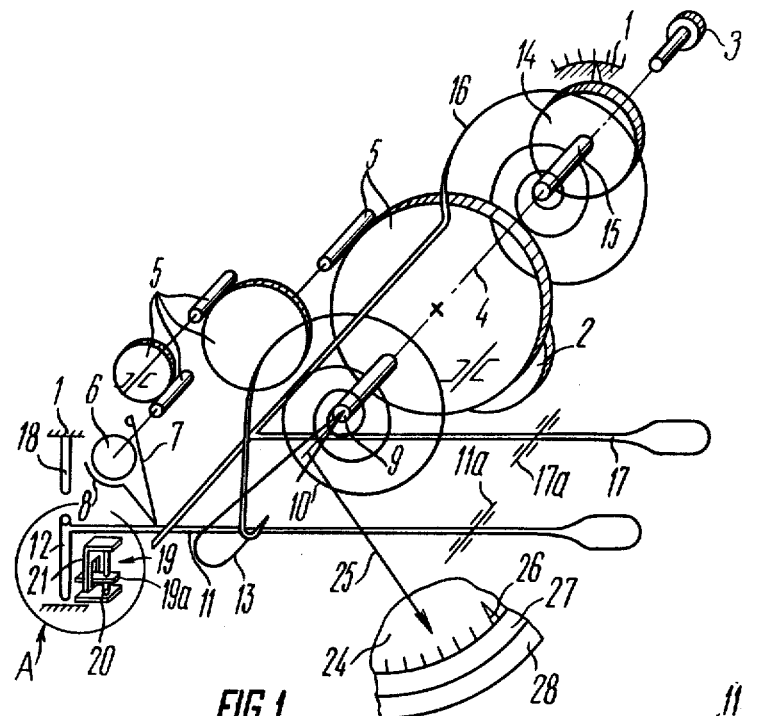
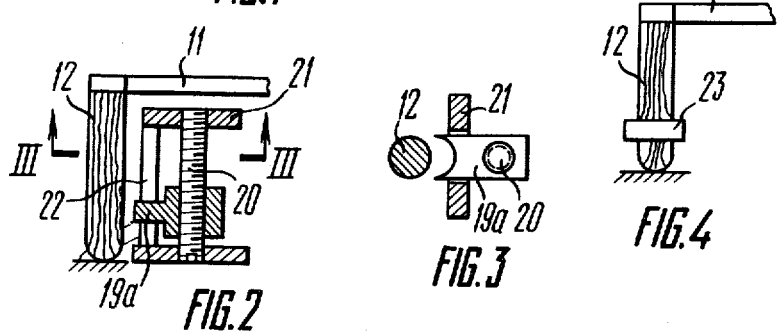
FIG.1
FIG.2  FIG.3  FIG.4

APPARATUS WITH A PERMANENT MAGNET FOR GAUGING THE THICKNESS OF COATINGS ON METAL PRODUCTS WITH MAGNETIC SHUNT TO ADJUST FOR DEMAGNETIZATION OF THE PERMANENT MAGNET

BACKGROUND OF THE INVENTION

1. Field of the Invention

The present invention relates to magnetic gauging systems, and more particularly, to an apparatus for gauging the thickness of coatings on metal products.

The invention can find advantageous application in gauging the thickness of nickel coatings on ferromagnetic and nonmagnetic bases, as well as for gauging the thickness of nonmagnetic coatings on ferromagnetic base.

2. Description of the Prior Art

There is known an apparatus for gauging the thickness of coatings on metal products, wherein the thickness gauged by a permanent magnet is indicated as a function of the force required to attract this magnet to the product being gauged (cf. U.S. Pat. No. 3,716,779; Cl G 01B). This apparatus comprises a wheel system, a spring drive linked to the wheel system so as to enable its rotation; two levers balanced in a static state, one of which mounts a permanent magnet interacting through its field with the ferromagnetic coating of a product or with the base thereof in case of a nonmagnetic coating, the other lever interacting with the first lever in the event when its force necessary to break away the permanent magnet from the product being gauged is insufficient; two coiled springs, the first of each is connected through one end thereof with the first lever and through the other end with one of the shafts of the wheel system, the second of the two coiled springs being linked through one of its ends with the second lever and through the other end thereof with a spring tensioning control means; a magnetic element adapted to attract the permanent magnet after it has broken away from the product being gauged; a reset lever intended for returning the first lever to its initial position and rigidly secured to the central shaft of the wheel system, the former mounting a winding knob and a pointer for indicating a gauged thickness on a round scale.

When the apparatus is wound for gauging by means of the winding knob, the end of the magnet moves below the bearing plane of the apparatus and the wheel system is locked.

When the bearing surface of the apparatus is placed on the surface to be gauged, the end of the magnet lowers flush with the bearing surface and the wheel system is actuated by the spring drive. As this happens, the first coiled spring is wound until the permanent magnet is broken away from the product being gauged. As the permanent magnet breaks away from the surface being gauged, the first lever turns about its axis and the break spring fixed thereon is actuated to stop a break wheel incorporated in the wheel system, as well as the wheel system as a whole.

After the permanent magnet has broken away from the product being gauged, the former is attracted by means of the mangetic element provided to assure more reliable locking.

The additional lever as well as the second coiled spring extend the overall range of thicknesses covered by the apparatus. However, the apparatus is unsuitable for correcting the force of attraction of the permanent magnet, this being the reason for short service life thereof due to premature demagnetization of the permanent magnet caused by interfering fields.

It is an object of the present invention to provide an apparatus for gauging the thickness of coatings on metal products, wherein a means is provided for correcting the attractive force of a permanent magnet to thereby ensure a higher degree of accuracy and longer service life of the apparatus.

The invention provides an apparatus for gauging the thickness of coatings on metal products, comprising a casing accommodating: a wheel system, a spring actuator with a means for its winding linked to the wheel system so as to enable its rotation, two levers independently balanced in a static state, the first of which carries a permanent magnet interacting through its field with a ferromagnetic coating on a product or with the base thereof in case of a nonmagnetic coating, the second of the two levers interacting with the first lever in the event when its force necessary to break away the permanent magnet from the product being gauged is insufficient; two coiled springs, the first of which is connected through one end thereof with the first lever and through the other end with one of the shafts of the wheel system, the second of the two coiled springs being connected through one of its ends with the second lever and through the other end thereof with a spring tensioning control means; a magnetic element attached to the casing and adapted to attract the permanent magnet after the latter has broken away from the product being gauged; a reset lever intended for returning the first lever to its initial position and linked to the central shaft of the wheel system, the former mounting a pointer for indicating readings on a round-shaped scale rigidly secured to the casing, according to the invention, there is provided an adjusting shunt mounted in the casing for movement along the permanent magnet and intended for correcting the attractive force of the latter.

Such apparatus construction makes it possible to improve accuracy and enhance service life of the apparatus due to the possibility of correcting the attractive force of the permanent magnet.

The adjusting shunt is preferably provided with a plate half-embracing the permanent magnet movably mounted on a screw positioned in the casing, and an arrester intended for limiting the movement of said plate.

Such adjusting shunt is simple in construction and is readily adaptable to gauging the thickness of a wide variety of metal coatings.

Where the apparatus is used for gauging the surface of a predetermined thickness, the adjusting shunt is provided in the form of a ring surrounding the permanent magnet and retained thereon by force of friction.

The invention will be further described, by way of example only, with reference to the accompanying drawings, wherein:

FIG. 1 is an isometric view of an apparatus for gauging the thickness of coatings on metal products, according to the invention;

FIG. 2 is an enlarged view A of FIG. 1;

FIG. 3 is a cross-section III—III of FIG. 2;

FIG. 4 is an embodiment of the adjusting shunt provided in the form of a ring.

Referring now to the above drawings and to FIG. 1 in particular, there is shown therein an apparatus for gauging the thickness of coatings on metal products, which comprises a casing 1 accommodating a spring actuator 2 with a means for its winding, linked to a wheel system so as to enable its rotation. The means for winding the spring actuator 2 is provided in the form of a winding knob 3 arranged or located at one end of a central shaft 4 of the wheel system. The wheel system includes a train of gears 5 and a brake wheel 6. The brake wheel 6 is locked by means of a pin 7 and a brake spring 8. Fitted over the central shaft 4 of the wheel system, on the end thereof opposite to the winding knob 3, is a block 9 having one end of a first coiled spring 10 secured thereto, the other end of the coiled spring 10 being fixed to the end of a first lever 11. Fixed on the same end of the first lever 11 are the pin 7, brake spring 8 and a permanent magnet 12 (sensing element of the apparatus), interacting through its field with the ferromagnetic coating of a product (not shown) or with the base thereof in case of a nonmagnetic coating. The first lever 11 is returned to its initial position by means of a reset lever 13 fitted over the central shaft 4.

Mounted on the end of the central shaft 4 (on the side of the winding knob 3) in coaxial alignment therewith is a spring tensioning control means provided in the form of a flywheel 14 with a bush having a block 15 closely fitted thereover. Fixed to the block 15 is the inner end of a second coiled spring 16. The outer end of the coiled spring 16 is fixed to the end of a second lever 17. The same end of the second lever 17 has a bent-away arm interacting with the first lever 11. The both levers 11 and 17 are free to swing on fulcrums 11a and 17a about which they are balanced in a static state.

The apparatus of the invention is provided with a magnetic element 18 attached to the casing 1 within a certain distance from the permanent magnet 12 and arranged coaxially therewith. The magnetic element 18 is used to attract the permanent magnet 12 after it has broken away from the product being gauged.

Arranged or located on the side of the permanent magnet 12 is an adjusting shunt 19 intended for correcting the attractive force of the permanent magnet 12 (FIGS. 1,2). The adjusting shunt comprises a plate 19a formed with a threaded opening and mounted on a screw 20 located within the casing 1. The plate 19a half-embraces the permanent magnet 12 and is capable of moving therealong by means of the screw 20. The plate 19a is limited in its travel along the permanent magnet 12 by means of an arrester provided in the form of a guide 21 with a slot 22, such as shown in FIG. 2, which slot receives the plate 19a. The guide 21 and the screw 20 are fixed in position relative to the casing 1 of the apparatus.

Where the apparatus is used for gauging the thickness of a prescribed coating, the adjusting shunt 19 is provided in the form of a ring 23, such as shown in FIG. 4, which surrounds the permanent magnet 12 and is retained thereon by force of friction.

A gauged thickness is indicated on a round scale 24 (FIG. 1) secured to the casing 1 by means of a pointer 25 fixed on the central shaft 4 of the wheel system on the side of the block 9.

The apparatus of the invention operates in the following manner.

When the spring actuator 2 is wound by means of the winding knob 3, the reset lever 13 causes the end of the first lever 11 carrying the permanent magnet 12 to move towards its lowermost position until the brake pin 7 runs against the brake wheel 6. As this happens, the end of the permanent magnet 12 moves below the bearing plane of the apparatus and the pin 7 locks the brake wheel 6.

When the bearing surface of the apparatus is placed on the surface to be gauged, the end of the permanent magnet 12 lowers flush with the bearing surface and the first lever 11 moves through an angle sufficient for the pin 7 to release the brake wheel 6. The wheel system can now be driven under the action of the spring actuator 2. The central shaft 4 is also set in rotation, thereby causing the first coiled spring 10 to wind up until it assumes sufficient torque enabling the permanent magnet 12 to break away from the surface being gauged.

As the permanent magnet 12 has broken away, the first lever 11 turns about its fulcrum 11a, whereafter the brake spring 8, on coming in contact with the brake wheel 6, locks the latter and, consequently, the central shaft 4 together with the indication pointer 25.

If on complete winding of the first coiled spring 10 its torque is insufficient for breaking away the permanent magnet 12, the second more rigid coiled spring 16 is actuated to thereby turn the flywheel 14 through a requisite angle relative to the apparatus casing 1. From the coiled spring 16 torque is transmitted through the second lever 17 to the first lever 11 to be applied at a point of contact of the both levers.

Where single-type products are dealt with and, therefore, require no high-precision gauging, it is sufficient to determine whether the thickness of a coating lies within a preset range.

A permissible range of thicknesses is indicated on the scale 24 by indicators 26 which are set by independant turning and locking of sliding rings 27, 28 relative to the casing 1 of the apparatus.

The accuracy of the apparatus is periodically checked up by gauging the thickness of coatings on test samples. In case of an error occurring in the course of gauging the thickness of coatings on test samples, the force of attraction of the permanent magnet 12 is adjusted by means of the screw 20 (FIG. 2). In this case the plate 19a will travel in the slot 22 of the guide 21 along the permanent magnet 12. Depending on the position of the plate 19a, some of the force lines of the permanent magnet 12 will close in on the plate 19a, thereby altering the attractive force of the permanent magnet 12 acting on the product being gauged.

When the ring 23 (FIG. 4) is used as the adjusting shunt, some of the force lines of the permanent magnet 12 are redistributed to close in on the ring 23, thereby reducing the attractive force of the permanent magnet 12 acting on the product being gauged.

What is claimed is:

1. An apparatus for gauging the thickness of coatings on metal products, comprising:
    a casing;
    a wheel system including shafts mounted in said casing;
    spring actuator means linked to said wheel system for rotating said wheel system;
    means for winding said spring actuator means;
    a permanent magnet for gauging the thickness of coatings on metal products effected through interaction of its magnetic field with a ferromagnetic coating on the product or with a metallic base of a product having a nonmagnetic coating;
    two levers independently balanced in a static state;

a first of said levers carrying said permanent magnet;
a second of said levers interacting with said first lever when the force of the latter necessary to break away the permanent magnet from the product being gauged is insufficient;
two coiled springs;
a first of said coiled springs being connected through one end thereof with said first lever and through its second end with one of the shafts of said wheel system;
spring tensioning control means for controlling the tension of a second of said coiled springs, the second spring being connected through one end thereof with said second lever and through the other end with the spring tensioning control means;
a magnetic element attached to said casing and adapted to attract said permanent magnet after it has broken away from the product being gauged;
a reset lever for returning said first lever to an initial position, said reset lever being rigidly fixed to a central shaft of said wheel system;
an adjusting shunt mounted in the said casing for movement along said permanent magnet, said shunt correcting the attractive force of said magnet to thereby adjust for demagnetization of the permanent magnet;
a round scale secured to said casing;
a pointer fixed on the central shaft of said wheel system for providing thickness indication on said round scale.

2. An apparatus for gauging the thickness of coatings on metal products as claimed in claim 1, wherein the adjusting shunt includes a plate half-embracing the permanent magnet, said plate being positioned on a screw mounted in said casing, and an arrester intended for limiting the movement of said plate.

3. An apparatus for gauging the thickness of coatings on metal products as claimed in claim 1, wherein the adjusting shunt is provided in the form of a ring surrounding the permanent magnet and retained thereon by force of friction.

* * * * *